United States Patent
Jenkins et al.

(10) Patent No.: US 9,829,128 B2
(45) Date of Patent: Nov. 28, 2017

(54) COMPRESSIBLE COUPLING

(71) Applicant: Parker Hannifin Manufacturing Limited, Hertfordshire (GB)

(72) Inventors: Andy Jenkins, Braunton (GB); Matthew Hills, Broadstone (GB); Paul Shaddick, Dubai (AE)

(73) Assignee: Parker Hannifin Manufacturing Limited, Hertfordshire (GB)

( * ) Notice: Subject to any disclaimer, the term of this patent is extended or adjusted under 35 U.S.C. 154(b) by 0 days.

(21) Appl. No.: 14/659,972

(22) Filed: Mar. 17, 2015

(65) Prior Publication Data

US 2015/0192230 A1 Jul. 9, 2015

Related U.S. Application Data

(63) Continuation of application No. PCT/GB2013/052424, filed on Sep. 17, 2013.

(30) Foreign Application Priority Data

Sep. 17, 2012 (GB) .................................... 1216560

(51) Int. Cl.
*F16L 19/14* (2006.01)
*F16L 19/08* (2006.01)
(Continued)

(52) U.S. Cl.
CPC ........... *F16L 19/083* (2013.01); *F16L 19/075* (2013.01); *F16L 19/10* (2013.01); *F16L 19/14* (2013.01); *Y10T 29/49925* (2015.01)

(58) Field of Classification Search
CPC ......... F16L 19/10; F16L 19/14; F16L 13/146; F16L 19/083; F16L 19/075; Y10T 29/49925
See application file for complete search history.

(56) References Cited

U.S. PATENT DOCUMENTS 6,131,964 A 10/2000 Sareshwala
6,692,040 B1 * 2/2004 McKay ................. F16L 13/146
285/382
(Continued)

FOREIGN PATENT DOCUMENTS

EP 1046456 A1 10/2000
EP 1 195 550 A2 4/2002
(Continued)

OTHER PUBLICATIONS

International Search Report and Written Opinion for International Application PCT/GB2013/052424 dated Nov. 11, 2013.
Search Report of GB1216560.1 dated Jan. 17, 2013.

*Primary Examiner* — David E Bochna
*Assistant Examiner* — James A Linford
(74) *Attorney, Agent, or Firm* — Thomas G. Fistek

(57) ABSTRACT

A coupling comprises an inner body having an interior bore configured to receive a tube or the like. A collar is arranged to be axially received about the inner body. The collar being configured such that when it is forced onto the inner body, it applies a circumferential compressive force to deform the body inwardly. At least one interior annular projection defines one or more annular teeth arranged such that when a tube is received in the bore and the inner body is inwardly deformed by the collar, the one or more annular teeth engage the tube to seal with it. The inner surface of the bore comprises a plurality of circumferentially arranged projections defining a series of circumferentially spaced teeth axially spaced from the at least one annular protuberance and configured to engage the tube following compression of the inner body by the collar to prevent relative rotation between the tube and the inner body.

7 Claims, 6 Drawing Sheets

(51) Int. Cl.
*F16L 19/10* (2006.01)
*F16L 19/075* (2006.01)

(56) References Cited

U.S. PATENT DOCUMENTS

| | | | |
|---|---|---|---|
| 7,503,595 B2 * | 3/2009 | McKay | F16L 13/146 285/382 |
| 7,575,257 B2 * | 8/2009 | McKay | F16L 13/146 285/382 |
| 9,194,514 B2 * | 11/2015 | McKay | F16L 13/146 |

FOREIGN PATENT DOCUMENTS

| | | | | |
|---|---|---|---|---|
| GB | 2423561 A | 8/2006 | | |
| SA | CA 2455565 A1 * | 2/2003 | ............ | F16L 19/065 |
| WO | 2009/060462 A | 5/2009 | | |
| WO | 2010/080743 A1 | 7/2010 | | |
| WO | 2012/027785 A1 | 3/2012 | | |

* cited by examiner

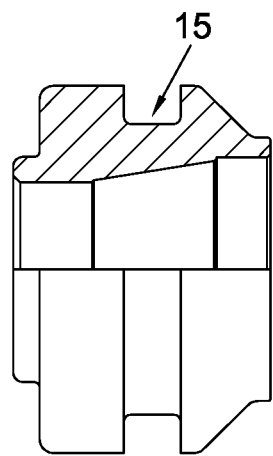
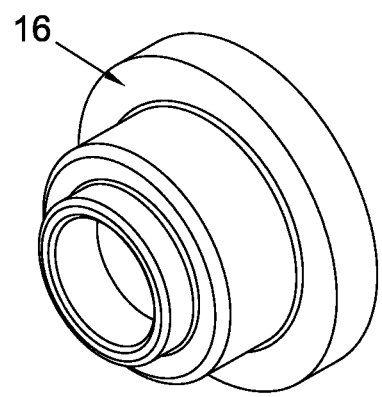
Fig. 4          Fig. 5
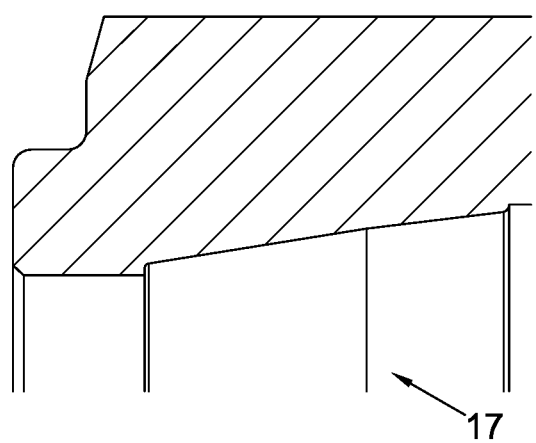
Fig. 6

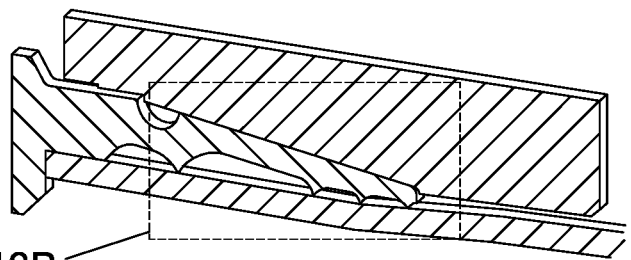
Fig. 13B
Fig. 13A
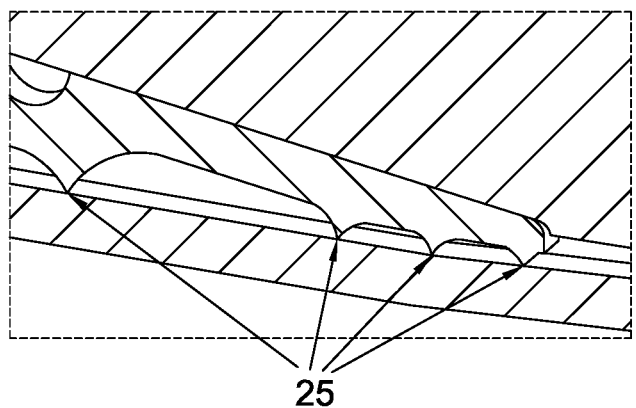
25
Fig. 13B

COMPRESSIBLE COUPLING

CROSS REFERENCE TO RELATED APPLICATIONS

This application is a Continuation of International Application No. PCT/GB2013/052424, filed on Sep. 17, 2013, which claims the benefit of GB Application No. 1216560.1, filed on Sep. 17, 2012, the disclosures of which are incorporated herein by reference in their entirety.

TECHNICAL FIELD

The present application relates to a coupling for attaching tubes, pipes, conduits and other round sections to other such items and/or other systems.

BACKGROUND

A ferrule compression fitting is commonly used as a connector and comprises one or more ferrules to be threaded over a tube or the like and a tightening device to cause the one or more ferrules to grip the outside of the tube or the like to provide a seal against leakage. GB 928,715 and U.S. Pat. No. 6,131,963 show examples of twin ferrule connectors. WO 2005/019716 discloses a tube fitting for a tube end, the tube fitting comprising a body with an interior bore to receive a tube end and a collar to be threadably coupled onto the body. The collar includes an integral tube gripping ring that co-operates with a camming surface on the body when the collar is threaded onto the body to force the ring to plastically deform into the tube end.

WO 2005/019717 discloses a tube fitting for a tube end, the tube fitting comprising a female threaded coupling member and a male threaded coupling member that are threaded together to assemble the fitting onto a tube end. Whilst being threaded together, a ferrule is detached from the female threaded coupling to form a separate ferrule fitting which is plastically deformed against the outer wall of the tube end and forms seals with the male coupling member and the tube end.

The following problems are associated with these designs and a variety of methods have been used in the past to overcome these issues.

- The design relies on the use of controlled material specifications to ensure that the ferrules have enhanced mechanical properties over that of the tube.
- The rear ferrule is treated by one of many processes to enhance the surface hardness. This in itself can cause issues as traditional hardening methods such as nitriding induces carbon into the material, which reduces the surfaces corrosion resistance.
- Tube selection is critical within the design. The tubing used with these fittings often has to be purchased with special restrictions of some properties such as skin hardness.
- Incorrect tube preparation can cause major problems within the assembly of the fitting and this is one aspect that the manufacturer has no control over.
- Longitudinal scratches on the tube can cause leak paths with these fittings. Basic tube handling commonly causes these scratches. These minor surface defects are often manually removed prior to assembly, which adds to the assembly time.
- Due to the requirement of enhanced materials it is accepted that compression fittings manufactured from austenitic stainless steel are not suitable for use within certain environments and do not comply with the NACE standards.

The method used to assemble a tube into a compression fitting relies on the end user adjusting the fitting until tube grip is achieved such as by using a threaded connection. This is detected by feel and thus every user will have their own opinion of when this is met. Once this point has been achieved the nut of the fitting is tightened by 1¼ turns and not to a specified torque or a dead stop. This is seen by a limitation within certain fields such as the automotive industry.

These problems are addressed in GB2423561 in which a coupling is described having an inner body with an interior bore passing through at least a portion thereof to receive a tube or the like, the bore having one or more interior annular protuberances extending into the bore, and a collar to be provided around the inner body to apply a circumferential compressive force to deform the body. In use, when a tube or the like is received in the bore of the body and the collar applies a circumferential compressive force thereto, the body is deformed such that the one or more annular protuberances engage the tube or the like to seal with it.

It has been found that in when a torque is applied to the fitting and/or the tube, relative rotation may occur between the body and the tube. Deformation of the tube by the annular protuberances of the body may not be uniform about the circumference of the tube. During relative rotation, high and low points generated at the interface between the annular protuberances and the tube may become misaligned which can lead to a failure of the seal between the tube and the body.

It is therefore desirable to provide an improved coupling which addresses the above described problems and/or which offers improvements generally.

SUMMARY

According to an aspect of the present disclosure there is provided a coupling for attaching to an end of a tube, pipe, conduit or other round solid or hollow section. The coupling comprising an inner body section having an interior bore passing through at least a portion thereof configured to receive a tube or the like. A collar is arranged to be axially received about the inner body, the inner body and the collar being configured such that when the collar is forced onto the inner body it applies a circumferential compressive force to deform the body inwardly. At least one interior annular projection is provided extending into the bore from the inner surface of the inner body section. The at least one annular projection defines in an axial direction one or more annular teeth arranged such that, in use, when a tube or the like is received in the bore and the inner body is inwardly deformed by the collar, the one or more annular teeth engage the tube or the like to seal with it. The inner surface of the bore further comprises a plurality of circumferentially arranged projections defining in a circumferential direction a series of circumferentially spaced teeth axially spaced from the at least one annular protuberance and configured to, in use, engage with the tube following compression of the inner body by the collar to prevent relative rotation between the tube and the inner body. The circumferential teeth are a series of raised portions interspaced by recess defining a circularly castellated or serrated configuration, and act as a rotational key to positively engage with the surface of the tube to prevent relative rotation.

The circumferential array of teeth penetrate the surface of the tube to a greater degree than the circumferentially adjacent recess. Part of the tooth extends into the surface of the tube creating a circumferentially interlocking arrangement between the tube and the inner body. This interlocking arrangement acts to prevent or at least mitigate relative rotation between the tube and the inner body by rotationally locking the two components, while the annular projection simultaneously seals with the surface tube. As such, when a torque is applied to the tube and/or the coupling, the seal created by the annular projection is maintained through the prevention of relative rotation between the tube and the inner body that has been shown to break the seal. The teeth are arranged such that when the inner body has been compressed onto the tube the teeth remain circumferentially spaced from each other. The teeth are also configured such that when compressed onto the tube the outer surface of the tube simultaneously compresses at the point of engagement with teeth and expands or bows into the spaces between the teeth thereby optimising the rotational purchase between the two surfaces. The teeth extend from a complete and uninterrupted annular portion of the tube with the inner wall of the bore extending between the base of each tooth. This arrangement ensures that the teeth remain spaced from each other when radially compressed rather than collapsing inwardly towards each other.

The plurality of teeth may be circumferentially spaced from each other and axially aligned at a common axial position defining a circumferential row of teeth. This specific configuration is both efficient and cost effective from a manufacturing perspective as well as providing a highly efficient rotational locking configuration.

The coupling may comprise a plurality of axially spaced rows of teeth. The inclusion of multiple rows of teeth increases the rotational resistance.

The plurality of axially spaced rows comprises a pair of adjacent axially parallel rows of teeth. The teeth of each row may be circumferentially aligned at common circumferential positions. Providing the rows of teeth in an adjacent parallel relationship enables the teeth to be advantageously formed by a single machining step.

The teeth are defined by a series of regularly spaced raised projections interspaced by corresponding recesses. The teeth effectively defined a toothed gear or castellated configuration.

The inner body may comprise an opening at its distal end arranged to receive said tube or the like and said circumferential teeth are arranged towards the distal end of the bore relative to said one or more annular protuberances. Providing the teeth at the distal end of the inner body advantageously enable the teeth to be formed in the method described below. In addition, as the distal end of the inner body experiences the greatest degree of inward deformation the teeth achieve the greatest purchase with tube through their location at the distal end thereby optimising the resistance to rotation.

In another aspect of the disclosure, a method of manufacturing a coupling for attaching to an end of a tube, pipe, conduit or other round solid or hollow section, the coupling is provided. The method comprises:
forming an inner body section for receiving a tube of the like from a substantially solid inner body member by the steps of:
a) forming a plurality of axially extending channels at least partially through the inner body member arranged in a circular array concentric with the central axis of the cylinder, the radially outermost points of the channels defining an outer channel array perimeter and the radially innermost points defining an inner channel array perimeter;
b) creating a bore at least partially through the inner body member and co-centric with the central axis thereof having a diameter greater than the diameter of the inner channel array perimeter and less that outer channel array perimeter such that the bore diameter intersects the channel array to form a series of circumferentially arranged teeth defined by axially extending channels open to the bore; and
c) forming at least one annular projection extending into the bore that is axially spaced from the circumferential array of teeth; and
providing a collar arranged to be axially received about the inner body, the inner body and the collar being configured such that when the collar is forced onto the inner body it applies a circumferential compressive force to deform the body inwardly.

The above describes method obviates the requirement for complex machining of a toothed formation within an existing bore by pre-forming the teeth through the annular daisy drilling operation. Once the circular array has been created the teeth are created by the boring operation without the requirement for significant further detailed precision machining.

The array of channels may be formed to a depth less than the axial position of the at least one annular projection. This ensures that the annular projections are able to extend radially to the same distance as the teeth without being circumferentially interrupted by the groves of the channels.

The inner diameter of the circumferential teeth array and the inner diameter of the at least one annular projection may be substantially the same. It has been found that this arrangement enables an optimum rotation resistance to be achieved without compromising the seal created by the annular projections.

The circumferential array of teeth can be formed proximate the opening of the bore. In addition, the inner body member can be a substantially cylindrical member.

The coupling requires only two parts, thereby reducing manufacturing costs and making assembly straightforward. Furthermore as the body, which has one or more interior annular protuberances which extend into the bore prior to use, is deformed such that the one or more annular protuberances provided thereon are forced into engagement with the tube or like, it has been found that a particularly robust seal is provided. The tube or the like is retained in the inner body providing considerable resistance to being axially withdrawn.

The body can have a frusto-conical or cylindrical portion with the bore and one or more interior annular protuberances therein, and may be arranged such that the collar may be provided around the frusto-conical or cylindrical portion so that, in use, the frusto-conical or cylindrical portion is deformed by the collar.

As the inner body upon which the annular protuberances are provided is deformed, the annular protuberances can undergo a larger radial displacement than conventional ferrules. This larger radial displacement enables higher compressive loads to be placed on the tube or the like providing better seals and grip and the coupling can be used with tubes or the like with larger dimensional tolerances than conventional ferrule couplings. Furthermore, the large radial displacement of the annular protuberances compresses the cross-section of the tube or the like where they engage which splays the tube or the like on either side. The splaying of the tube or the like on either side enhances the resistance to withdrawal of the tube or the like from the coupling. The larger radial displacement of the annular protuberances enables the coupling to be used with tube or the like which has not been specially prepared and which may have scratches reducing preparation time for the tube and thus costs. Furthermore, unlike conventional ferrule fittings, the tube or the like does not need to abut against a stop within the coupling as the protuberances provide such a good seal. This overcomes the need for the end of the tube or the like to be cut precisely square, further reducing preparation time and costs. The larger radial displacement of this coupling compared to conventional ferrule fittings provides larger forces such that the material of the engaging protuberances does not need to be specially hardened unlike conventional ferrule fittings. However, the protuberances could, if desired, be hardened for advanced performance. The larger radial displacement of this coupling also ensures that the protuberances engage all points around the circumference of a tube or the like, even when its cross-section is not precisely round. For example a tube or the like with a slightly oval cross-section will be pushed back into shape and a better connection will be made compared to conventional fittings.

The interior annular protuberances on the inner body may compress the outside of the tube or like to which it is fitted. However, the interior annular protuberances may have a cutting surface to breach the skin of a tube or the like to which it is fitted. The skin of a tube or the like has a higher level of hardness than it's core material resulting from its manufacture. By the cutting surface being able to breach the skin of a tube or the like to reach the softer core material, a superior seal and resistance to axial removal of the tube or like is obtained.

Any number or size of interior annular protuberances may be provided depending upon requirements. If more interior annular protuberances are provided, a more robust seal is achieved.

The collar may be arranged to apply a circumferential compressive force to deform the body in any suitable way, for example a so-called shaft clamp, hub clamp or hose type "jubilee" clamp may be used. However, the inner body and the collar may each have complimentary camming surfaces inclined to their axes which co-act to apply the circumferential compressive force to deform the body. The collar and the inner body may be arranged to be moved relatively towards each other so that the camming surfaces co-act. The collar and the inner body may be moved towards each other by any suitable means, such as by using an appropriate tool or by using corresponding threads on the inner body and collar such that the collar is rotated relative to the inner body to pull it over the inner body. The complimentary camming surfaces may be inclined at any desirable corresponding angles to provide a longer or shorter distance over which the inner body and collar may be moved towards each other. The complimentary camming surfaces may be provided by an external frusto-cone on the inner body and a corresponding frusto-conical inner surface within the collar. One or both of the camming surfaces could be provided with a friction reducing coating or plating to reduce the forces required during use.

Once the collar and inner body are moved towards each other sufficiently, a holding means keeps them in the desired relative positions. The holding means may be an interference fit.

According to a second aspect of the present invention there is provided a method of attaching a coupling to an end of a tube, pipe, conduit or other round solid or hollow section, the method comprising providing a tube or the like into a bore passing through at least a portion of an inner body, the bore having one or more interior annular protuberances extending into the bore; and providing a collar around the inner body and using the collar to apply a circumferential compressive force thereto so that the body is deformed bringing the one or more annular protuberances into engagement with the tube or the like.

BRIEF DESCRIPTION OF THE DRAWINGS

Embodiments of the present invention will now be described by way of example only, with reference to the accompanying drawings in which:

FIG. 4 shows another collar partially in cross-section;

FIG. 5 shows a perspective view of another collar;

FIG. 6 shows a cross-section of another collar;

FIG. 7 shows a perspective view of a collar and an inner member pre-assembled onto a tube or the like;

FIG. 13A shows an alternative view of a collar fitted over an inner member;

FIG. 13B shows an enlarged view of the indicated area in FIG. 13A;

DETAILED DESCRIPTION OF THE DRAWINGS

Figure 1:
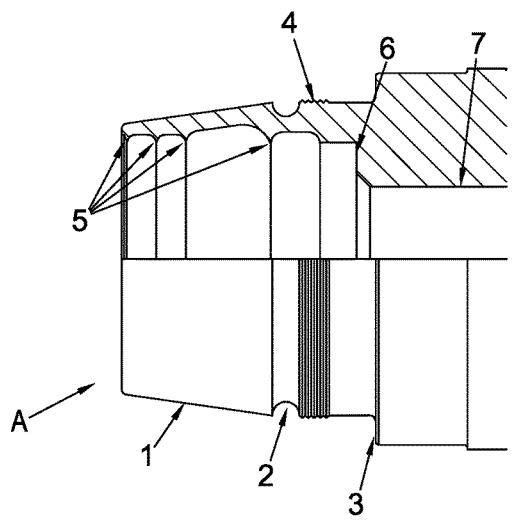
FIG. 1 shows an inner member partially in cross-section.
Figure 3:
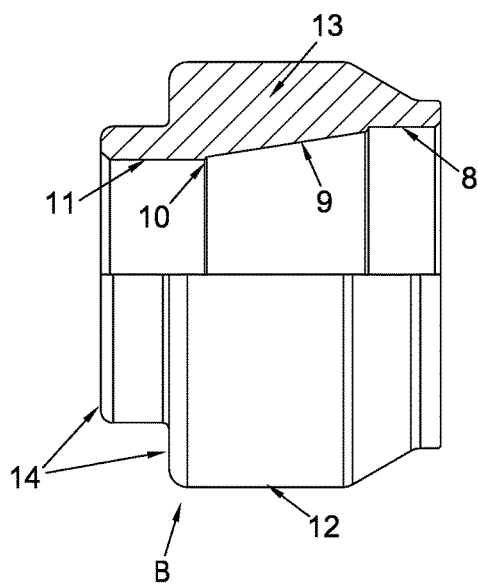
FIG. 3 shows a collar partially in cross-section.

Referring to FIG. 1, a coupling comprises an inner body or sealing member A and a separate collar section B as shown for example in FIG. 3. The inner body or sealing member A seals against a tube (not shown) and also retains the tube in position relative to a second tube section. The inner body A will be referred to as the claw end in the following description.

Figure 2:
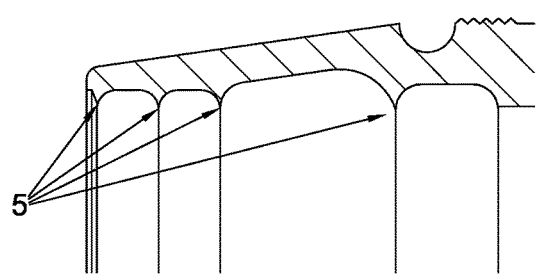
FIG. 2 shows an enlarged view of a portion of the inner member.

The claw end A has an outside surface with an external frusto-cone 1 which is inclined to the longitudinal axis of the claw end 2. In a preferred embodiment as shown in FIGS. 1 and 2 the frusto-conical surface 1 is inclined at around 20°. A groove 2 is formed at the larger proximal end of the frusto-cone 1. In the arrangement of FIG. 2 the groove is of semicircular configuration, but other groove cross-sections may be provided to achieve the same result such as a stepped square form. A shoulder 3 is provided axially inwards of the groove 2. The shoulder 3 provides a positive stop as discussed further below.

The section of the claw end 1 between the groove 2 and the shoulder 3 may comprise a number of small grooves 4. These grooves 4 are to give an interference fit to connect the inner body claw end A to the collar section such that the collar section is physically connected to held and retained on the claw end 1. Alternatively an interference fit such as a plain portion or a slightly tapered portion, or a screw thread may be provided. Other combinations of angles, grooves and serrations have also been proven to give adequate functionality.

The claw end A comprises an inner bore configured to receive a tube. Internally the claw end A comprises a plurality of interior annular protuberances or teeth 5 that extend circumferentially about the inner bore and project radically inwards. The teeth 5 may be formed with a taper having a proximal end defining a sharp point or may be provided with small proximal radii of around 0.2 mm at their apices or small flat lands of around 0.2 mm width. It should be noted that in this example four teeth are shown but the number of teeth may be varied depending upon sealing performance requirements.

In the embodiment shown, a uniform cylindrical bore 7 is provided at the inner end of the bore inwardly from the open end of the claw end A, beyond the teeth 5. The bore 7 is of reduced diameter defining an internal shoulder 6 at its transition. The internal shoulder 6 provides a stop to define a depth guide for tube insertion with the reduced bore serving to reduce part weight.

As shown in FIG. 3 the collar B includes an internal profile comprising a leading cylindrical portion 8, which is designed to give an interference fit with the grooved section 4 of the claw end A. This leading cylindrical portion 8 could be replaced by a slightly tapered portion or a grooved or threaded portion (similar to that of the grooved portion on the claw end 4) that would also generate an interference fit. Other profiles have also been used such as a small lip and/or an additional spring clip. Following the leading cylindrical bore 8 the form an internal taper 9 is provided. In the arrangement of FIG. 3 the taper is approximately 20°. However, any taper could be provided for example between 5° and 80° or between 10° and 30°. This internal frusto-conical profile 9 is then transitioned into a small step 10 that contains a large radius at the interchange between the cone 9 and the step 10. There is also a plain cylindrical bore 11 through the remainder of the collar through which a tube/pipe will pass through. Other combinations of angles, grooves and serrations have also be proven to give adequate functionality.

The external profile 12 of the collar, unlike most existing tube fittings can be manufactured from any available material section e.g. round, hexagonal, square cross-section. The only requirement of this external profile is that adequate wall thickness 13 between the internal cone 9 and the external profile 12 is provided, so that swelling of the external profile 12 is restricted. This restriction ensures that the deformation generated by the two engaging frusto-cones 1 & 9 is produced internally onto the tube and not externally onto the collar external profile 12.

The last profile of the external form of the collar B is by means of a number of solid face(s) 14 which are perpendicular to the axis of the internal profile. This profile is utilised to enable an axial force to be applied the collar B to force it onto the claw end A. It should be noted that although in the example of FIG. 3 the profile 14 is provided at the same end of the collar as the plain bore 11, this profile 14 which is utilised to force the collar onto the claw end could be provided by means of an undercut 15 in the external profile 12 of the collar as shown in FIG. 4 or an additional shoulder 16 as shown in FIG. 5.

It is important to note that although in FIGS. 3 and 4 the internal frusto-cone 9 is shown as one continuous angle, it would also be possible to utilize two or more angles 17 as shown in FIG. 6 to change the rate of deformation at any given point during compression. It should also be noted that in both components a frusto-cone inclined to the component axes by around 20° has been described. However, other angles would be acceptable for use. By lessening the angle the amount of compression generated per unit of collar movement would be reduced, as would the force required to generate this movement. A larger angle would have the opposite effect. The inclination can be selected appropriately for envisaged uses of particular connectors.

Figure 7:
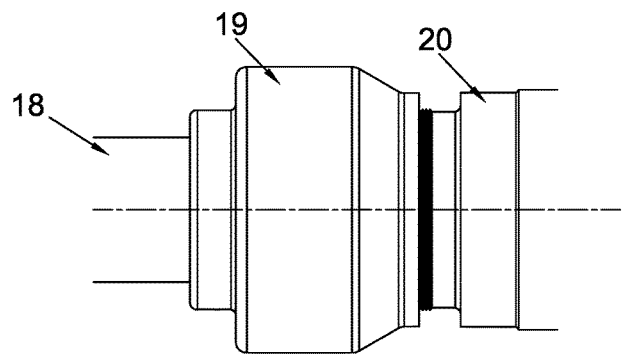
Figure 8:
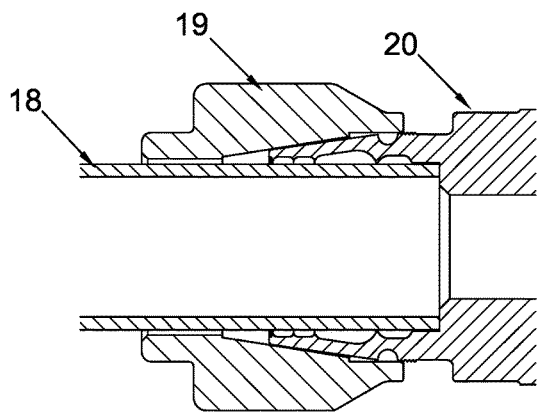
FIG. 8 shows a cross-sectional view of a collar being moved axially relative to an inner member.

The coupling is provided as a pre-assembled component, with the collar B fitted onto the inner body A in an initially non-compressed condition as shown in a perspective view in FIG. 7 and in cross-section in FIG. 8. In use a piece of tube 18 is inserted through the trailing bore 11 of the collar 19. The tube is then inserted through the internal profile of the claw end A ensuring that the tube travels past the last tooth 5 and into the plain cylindrical portion and into abutment with the shoulder 6. In this example the tube is inserted to a dead stop, however this feature is not a necessity and can be omitted if required, providing an alternative method of ensuring that the tube is inserted to the correct distance is provided.

Figure 9:
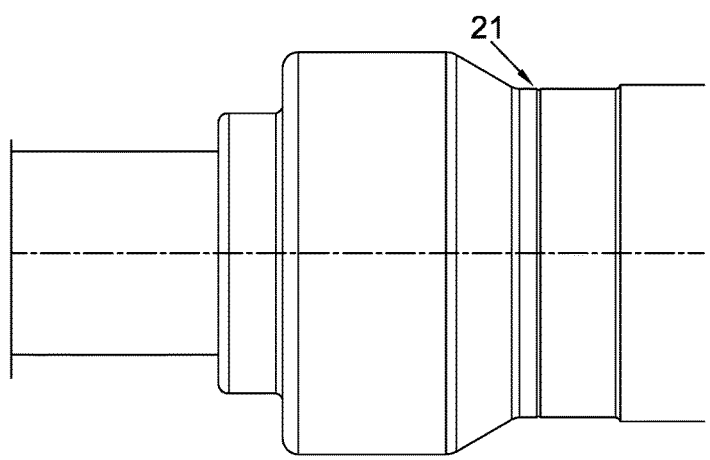
FIG. 9 shows a perspective view of a collar on an inner member after activation.

Once the tube 18 is in place, the collar 19 is forced onto the claw end 20. In this example this force is generated by an external method such as a hydraulic ram, a pneumatic ram or an electrical linear slide, such that the two components are 'simply' pushed together. However, the collar 19 can be forced onto the claw end 20 by any suitable method. As the collar 19 is forced over the external frusto-cone 1 of the claw end 20, the external frusto-cone 1 engages with the internal frusto-cone 9 or cones 17 of the collar. In this example the solid face 14 would be used to apply the linear force until the opposite end of the collar makes contact 21 with the shoulder 3 of the claw end as shown in FIG. 9.

Figure 10:
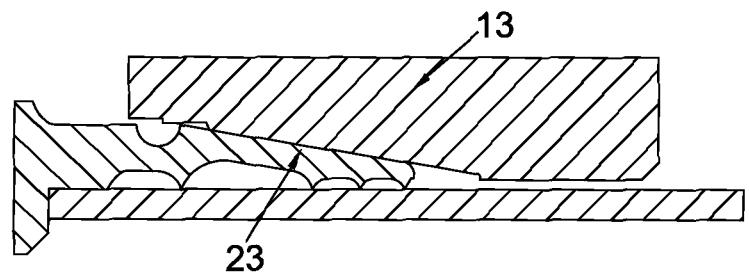
FIGS. 10 to 12 show the various stages of a collar being moved axially relative to an inner member.
Figure 11:
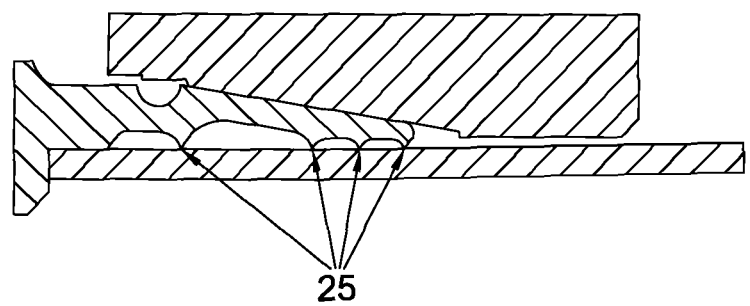
Figure 12:
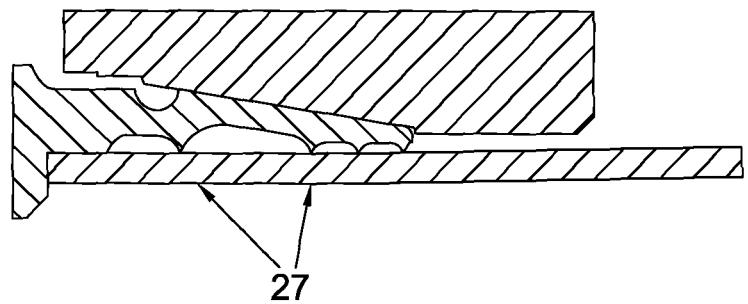

Internally during compression, the form of the end of the claw end alters as shown in FIGS. 10 to 12. The components are supplied with the collar fitted to the end of the claw end and retained by means of an interference fit. In FIG. 10 the tube is shown fully inserted. During compression the internal tapered portion 9 & 17 of the collar engages with the external frusto-cone of the claw end 1. Providing that the thickness of the collar 13 is adequate to resist the hoop strength of the claw ends section 23, the form of the claw end will begin to compress inwards. This compression will pivot about the semi-circular undercut 2. Tube grip occurs at this point when the claw end's teeth 5 make contact 25 with the tube 18 as shown in FIG. 11. Ideally all teeth will make contact at the same point during actuation, however this is not essential.

The teeth 5 will primarily cut into the outer skin of the tubing 18 until a point where the forces required to cut into the skin become larger than the forces required to deform the tube. At this point the tube 18 will begin to deform 27. As shown in FIG. 12, this will result in the tube swelling in some areas and in some areas contracting. This deformation combined with the initial tube bite produces two outcomes that are particularly advantageous when considering a tube/pipe fitting. Firstly a high quality seal is achieved between the tube 18 and the internal form/teeth 5 of the claw end. These seal points 28 are shown in FIG. 13. Please note the seal points shown in this example are dependent upon the number of teeth and their position and can be varied as required.

When fully compressed as shown in FIG. 12, the tube 18 is also deformed 27 resulting in a form that cannot be removed from the claw end. This tube bite/compression is shown in FIG. 13. The outer skin of the tubing is broken 28 by each tooth 5. This results in an enhanced seal due to the fact that the skin of tube/pipe has a higher level of hardness than the core material due to cold forming processes used in its manufacture.

As shown in the embodiment of FIG. 13, the leading front two protuberances 5a and 5b of the claw end A are formed to define rows of teeth 30 arranged circumferentially about the inner surface of the bore. While the following describes the an arrangement including said circumferential teeth, the above description of the collar and inner body arrangement applies to this embodiment, with the only difference being the varied form of the front two annular projections, which are replaced by circumferential teeth. The following described feature should therefore be considered to be herein described in any suitable combination with eth above described features.

Figure 14:
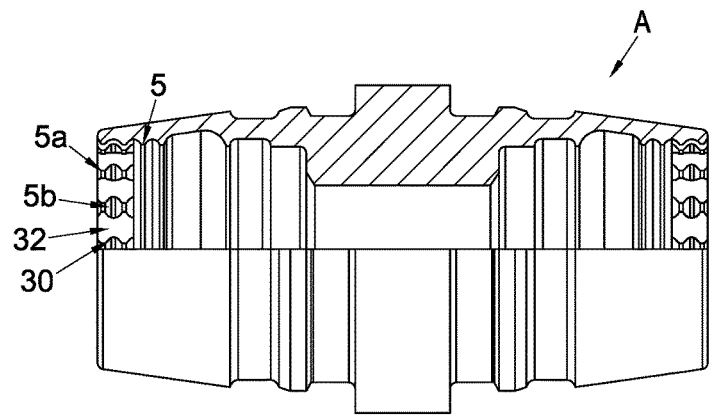
FIG. 14 shows a partial section view of an inner body section according to an embodiment of the invention.
Figure 15:
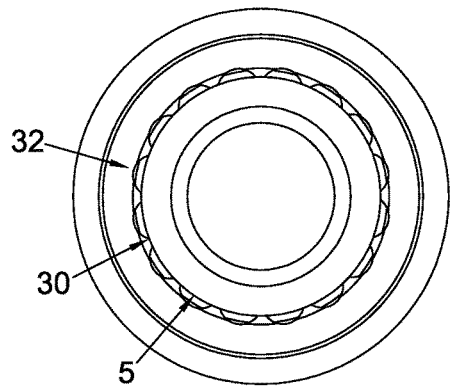
FIG. 15 shows an end view of the inner body section of FIG. 14.

The annular projections 5a and 5b are provided with an intermittent, non-continuous form, whereas the remaining rearward teeth 5 extend continuously around the inner surface of the bore. Here the term 'rearward' is used to describe a location axially inward into the bore relative to the open distal end. An end view of the distal end opening of the claw end A in FIG. 14 shows that the circumferential teeth 30 are defined by a series of peaks 32 interspaced circumferentially be a series of troughs 34, with the peaks extending radially into the bore to a greater distance than the troughs or recesses 34. The peaks defining the teeth 30 may extend inwardly to substantially the same distance as the remaining continuous axially arranged teeth 5. The teeth 30 of each row 5a and 5b may be all axially aligned such that they circumferentially extend at a common axial location. The teeth 30 of rows 5a and 5b are also circumferentially aligned with each other at common circumferential but axially spaced positions.

As the collar B is forced over the claw end inner body A, the circumferentially continuous inner teeth 5 create a circumferentially continuous annular seal with the tube 18 at multiple axial positions as they engage with and bite into and deform the tube 18. The two front rows 5a and 5b of teeth 30 also bite into and deform the tube 18. As the teeth 30 cut into the surface of the tube the raised teeth 30 penetrate into the tube to a greater distance than the relative lows of the recesses 34. In this way the teeth 30 create an interlock with the surface of the tube. As the teeth 30 penetrate and lock into the surface of the tube they rotationally lock the inner body A relative to the tube. The teeth prevent or significantly reduce relative rotation between the tube and the inner body A, particularly compared to the rearward teeth 5 which are continuous and annularly uniform in the circumferential direction and therefore provide no significant resistant to relative rotation. Therefore, in combination, the rear teeth 5 create a highly effective seal with the tube 18, and the front teeth 30 act to preserve this seal by preventing relative rotation between the tube and the inner body A under torque that in the prior art has been shown to cause failure of the seal.

In order for the front teeth 30 and rear teeth 5 to work effectively in conjunction with each other both sets of teeth can be machined to a high tolerance. A method of forming the inner body A has been developed that advantageously enables the front teeth 30 and rear teeth 5 to be formed to a high tolerance in an efficient and cost effective manner. In the arrangement of GB2423561, the bore is formed in a first machining step and then the axially arranged annular protuberances or teeth within the bore of the inner body are created by machining following formation of the bore, with the inner surface of the bore being turned to create the teeth.

In an embodiment of the present disclosure, the inner body is formed from a solid substantially cylindrical member which may be a solid bar stock section. Here the term cylindrical is used to mean a member having a longitudinal axis and a substantially circular profile when viewed from the end, and may include a member having a diameter that varies in size along its length and for example includes an outer surface profile as shown in the accompanying figures. The formation of the outer surface may be formed by any suitable means. With regard to the formation of the internal configuration, in a first step a plurality of channels are drilled into the end face of the inner body member. The channels are drilled in a circular array concentric with the centre axis of the inner body in a process commonly referred to as 'daisy drilling'. The cylindrical channels are drilled to a predetermined depth defining the maximum axial distance of the teeth from the distal end of the inner body. The channels are equally spaced in the circular array and each channel is circular in cross section. Following drilling of the channel array the bore of the inner body member is formed using any suitable means, which may include a combination of drilling and precision turning. The bore is formed having a diameter greater then the perimeter defined by the innermost points of the channels and less than the perimeter defined by the outermost points of the channels. In this way the bore intersects and cuts through the channels, opening them up to the bore and thereby creating a plurality of teeth defined by the high points between the recesses of the channels. The teeth are instantly defined by the remaining material once the inner boundaries of the channels are removed by the bore.

Following the formation of the bore a further turning operation is then perfumed to create annular channels separating the teeth into two axially parallel rows. A turning operation is also used to create the rearward axially spaced annular projections by removing material in a radially inward direction. The depth of the drilled channels is selected such that the channels extend axially to a distance which is less than the axial position of the annuar projections to ensure that the annular projection are circumferentially continuous and uninterrupted by the channels.

The above described method provides a highly effective and efficient method.

Embodiments of this invention address the issues currently encountered with the existing design as follows:

Embodiments of the invention can be manufactured from standard commercial material and require no enhancements. However, enhancements can be offered to meet the future demands of our ever changing industry needs. As an example, higher pressures/temperatures may require enhanced properties within the material or the material may require additional processing.

No treatment processes are required within the components of this design which reduces the corrosion resistance of the surfaces. However, enhancements can be offered to meet the future demands of our ever changing industry needs. As an example, higher pressures/ temperatures may require enhanced properties within the material or the material may require additional processing.

Embodiments of the invention are more tolerant to standard tubing and thus no special restrictions of some properties such as skin hardness need to be made.

Embodiments of the invention are tolerant to poorly prepared tubing.

Longitudinal scratches on the tube do not pose a problem to embodiments of the invention as the initial bite of the teeth cuts through the skin.

The coupling can be manufactured in materials which are compatible with various standards such as NACE.

The methods used to assemble the coupling to the tube can rely on either a thread or a mechanical tool, both of which can assemble to a dead stop or pre-determined torque.

The examples shown above utilise a body, which contains the claw end profile.

Figure 16:
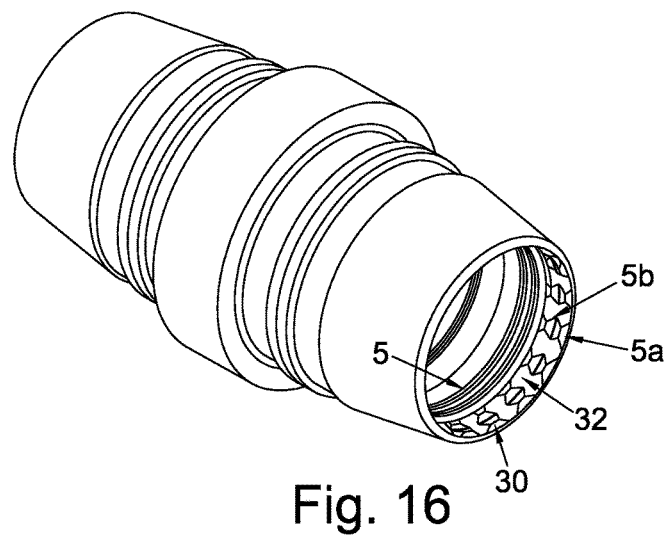
FIG. 16 shows an isometric view of the inner body of FIG. 14.

Many variations may be made to the examples discussed above without departing from the scope of the present disclosure. For example by increasing or decreasing the number of teeth within the claw end/ferrule, the sealing and tube retention properties would alter accordingly. It should also be noted that in some applications users may require the addition of a 'soft' seal, which would be placed in the recess 35 shown in FIG. 16 created between the claw end/ferrule and the tube. This recess will reduce in volume during compression of the collar/nut and thus result in compression of the 'soft' seal.

All of the above described components could be manufactured from any material including metallic and non-metallic materials. In addition to this by increasing the mechanical properties such as hardness of the teeth 5 the tube bite would be dramatically enhanced. The coupling described above can be used with a tube or the like made from any material. However, a tube or the like made from metal may be preferred. Such methods as already used in the twin ferrule industry could be used to generate these enhanced mechanical properties.

The following major differences between embodiments of the present disclosure and the prior art should be observed. Unlike the circumferential compressive force applied to deform the inner body such that the one or more annular protuberances engage a tube or the like in embodiments of the present disclosure, conventional twin ferrule fittings use a knurled effect within the body to grip the tube. This knurled section does not produce a seal or bite/cut into the outer skin of the tube. The seal with this style of fitting is achieved by the internal profile of the body nose and the tube profile being forced together to produce a compressed/moulded form which produces a seal but does not bite into the tube. It should also be noted that these conventional couplings are rated to far lower pressure ratings than the embodiments described herein, and are limited to what tube wall thickness can be used.

It will be appreciated that in further embodiments various modifications to the specific arrangements described above and shown in the drawings may be made. For example while described for use within the instrumentation tube fittings industry it may also be utilised for many other applications outside of this environment including but not limited to shipbuilding, aerospace, automotive, pipe connections, and construction using wire such as is common in the construction of suspension bridges. Furthermore, while described in use in conjunction with traditional tube the embodiments of the present disclosure may also be used with pipe, solid rod, wire rod or any other round section.

Whilst endeavouring in the foregoing specification to draw attention to Features, it should be understood that the Applicant claims protection in respect of any patentable feature or combination of features hereinbefore referred to and/or shown in the drawings whether or not particular emphasis has been placed thereon.

The invention claimed is:

1. A coupling for attaching to an end of a tube, pipe, conduit or other round solid or hollow section, the coupling comprising:
    a monolithic inner body section having an outer frusto-conical surface and an interior bore having an inner surface, the bore passing through at least a portion of the inner body and configured to receive a tube;
    a collar arranged to be axially received about the inner body, the inner body and the collar being configured such that when the collar is forced onto the inner body it applies a circumferential compressive force to deform the body inwardly; and
    at least one interior annular protuberance extending into the bore and defining in an axial direction one or more annular teeth arranged such that, in use, when a tube is received in the bore and the inner body is inwardly deformed by the collar, the one or more annular teeth engage the tube to form a seal with it;
    wherein the inner surface of the bore further comprises a plurality of circumferentially arranged projections defining in a circumferential direction a series of axially aligned, circumferentially spaced teeth forming longitudinal rows axially spaced from the at least one annular protuberance, at least one of the circumferentially spaced teeth extending into the bore from the inner surface the same distance as the at least one annular protuberance and configured to, in use, engage with and penetrate the surface of the tube following compression of the inner body by the collar to create a circumferentially interlocking arrangement between the tube and the inner body to prevent relative rotation between the tube and the inner body, wherein the inner surface of the bore further comprises a plurality of circumferentially spaced smooth portions extending circumferentially and longitudinally between the rows of circumferentially spaced teeth, and the outer frusto-conical surface surrounds the at least one annular protuberance and circumferentially spaced teeth prior to the collar being arranged around the inner body.

2. A coupling according to claim 1 wherein the plurality of teeth are circumferentially spaced from each other and axially aligned at a common axial position defining a circumferential row of teeth.

3. A coupling according to claim 2 comprising plurality of axially spaced rows of teeth.

4. A coupling according to claim 3 wherein the plurality of axially spaced rows comprises a pair of adjacent axially parallel rows of teeth.

5. A coupling according to claim 3 wherein the teeth of each row are circumferentially aligned at common circumferential positions.

6. A coupling according to claim 2 wherein the teeth are defined by a series of regularly spaced raised projections interspaced by corresponding recesses.

7. A coupling according to claim 1, wherein the inner body comprises an opening at its distal end arranged to receive a tube and said circumferential teeth are arranged towards the distal end of the bore relative to said one or more annular protuberances.

* * * * *